UNITED STATES PATENT OFFICE.

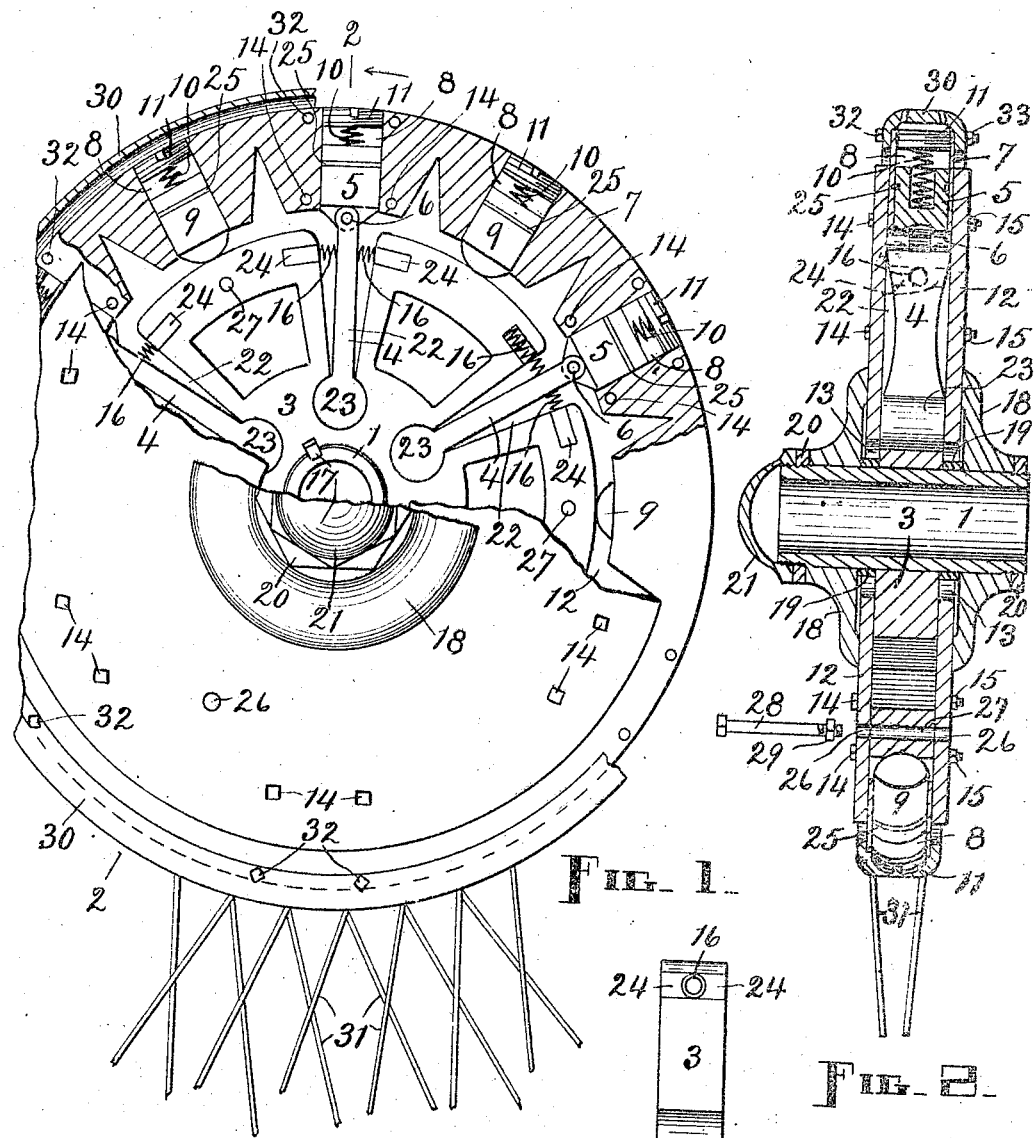

JOSEPH W. BREADY, OF SPRINGFIELD, MASSACHUSETTS, ASSIGNOR OF ONE-THIRD TO CHARLES P. KENNEY, OF SPRINGFIELD, MASSACHUSETTS.

RESILIENT WHEEL-HUB.

1,080,253.  Specification of Letters Patent.  Patented Dec. 2, 1913.

Application filed April 30, 1913.  Serial No. 764,492.

*To all whom it may concern:*

Be it known that I, JOSEPH W. BREADY, a citizen of the United States of America, residing at Springfield, in the county of Hampden and State of Massachusetts, have invented a new and useful Resilient Wheel-Hub, of which the following is a specification.

My invention relates to improvements in wheels for automobiles and similar vehicles, and more especially to the hubs of such wheels, and said invention consists of a central slotted disk adapted to be mounted on an axle and provided with rocking arms, and a floating annulus mounted on such disk and arms, such annulus having attached thereto or connected therewith the inner ends of the spokes of the wheel, together with such other parts and members as may be needed to complete the hub, all as hereinafter set forth.

The main object of my invention is to provide a yielding wheel hub, which is comparatively simple in construction, and is capable of absorbing shocks to the extent of enabling the machine to ride easily and without jarring and unpleasant motion, even in the absence of the pneumatic tire. When this hub is used, the pneumatic tire may be dispensed with altogether, as just intimated, or such tire may be provided for the wheel of which said hub forms a part, and when so provided lasts longer than would be the case if the hub of the wheel were unyielding. The presence of this hub also reduces the engine and transmission strains of the machine to the minimum.

A further object is to make provision in such a hub for emergencies, such as the breaking of any of the springs or other hub elements, so that the floating annulus can without difficulty be locked securely to the disk, thus converting the hub into a practically solid and unyielding structure, which is an important and valuable feature of my invention.

All of the springs are arranged in the same plane in the hub, wherefore ungainly lines and undue bulk are avoided, and true mechanical principles are adhered to. The hub members are attachable and detachable at will, consequently repairs can be easily and quickly made.

Other objects and advantages will appear in the course of the following description.

A preferred form of embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of the invention.

In the drawings, in which like numerals designate like parts throughout the several views, Figure 1 is a front elevation, partly broken away and partly in section, of a hub which embodies the invention as aforesaid; Fig. 2, a cross-section through said hub, taken on lines 2—2, looking in the direction of the associated arrow, in Fig. 1, and Fig. 3, a detail in cross-section of a portion of the hub center or slotted disk with the sleeve.

Upon reference to the drawings, it will be seen that, in its general construction, the hub comprises an axle sleeve 1 and a disk 3, six, more or less, oscillatory or rocking radial arms 4 spaced at equal distances from each other on bearing centers, a series of pistons or plungers 5, each pivotally attached at 6 to the outer end of one of said arms, a floating annulus or ring 7 of larger internal diameter than the peripheral diameter of said disk, said ring having radial chambers 8 therein for said plungers and for a second set of plungers 9, the latter being arranged alternately with said first-mentioned plungers, springs 10 in said chambers, between the outer ends of the plungers which operate therein and a series of screw-plugs 11, face-plates 12—12 having open centers 13—13 and being secured to opposite sides of said ring by bolts 14 and nuts 15, and springs 16, a pair for each of said arms, together with certain other parts and members which will presently be described.

The sleeve 1 and the disk 3 are either made in one piece, or else are rigidly connected, as by a spline 17, shown in Fig. 1, so that to all intents and purposes they are integral. The axle of the vehicle is received in the sleeve 1, and said sleeve with the other parts of the hub and wheel revolve on such axle in the ordinary and usual manner. Said sleeve projects both ways from the disk 3, and these projecting parts have mounted thereon two flanges 18. Spacer rings 19—19 are placed on the sleeve 1, on each side of the disk 3, and the flanges 18 are held firmly against said rings and securely on said sleeve by means of two nuts 20 screwed onto the outer terminals of the sleeve against the outer ends of said flanges. The front end of the sleeve 1 is also provided with a removable cap 21 to cover the parts at this point for the purpose of excluding dust and dirt from the axial bearing and revoluble members.

The flanges 18 on the inside fit snugly against the outer faces of the face-plates 12, but are prevented from binding thereon by the rings 19. The face-plates 12, therefore, are permitted to move freely between the flanges 18, and there should be the same amount of clearance between the edges of the openings 13 therein and the peripheries of said rings, that there is between adjacent surfaces of the ring or annulus 7, that carries said face-plates, and the disk 3. Thus it is clear that the face-plates can not interfere with the action or movement of the floating ring.

The purpose of the face-plates 12 is to inclose the interior hub mechanism or yielding parts, and access to such parts from either side is had upon the removal of the nut 20 and flange 18 from the corresponding terminal of the sleeve 1, first taking off the cap 21, if access is to be had from the front side, and the removal of the face-plate from the same side. The bolts 14 pass through both face-plates 12 and the ring 7, and it is necessary to take the nuts 15 off of said bolts and then to take out the latter in order to release said face-plates or either of them.

The disk 3 has a series of radial slots 22 therein for the arms 4. Each arm 4 has a bearing head 23 at its inner end, and the inner end of each slot 22 is shaped to form a bearing for such head, while such slot outside of the recess for the head has sides that diverge as they extend toward or approach the disk periphery, so as to enable said arm to rock, in the direction of rotation of the hub either way, to whatever extent may be necessary.

The springs 16 in each pair, are pocketed in the disk 3 in such positions that they extend out into one of the slots 22 near its outer end and bear against opposite edges of the arm 4 in such slot. Thus the springs 16 normally center the arms 4 in their slots, assist in absorbing shock when the arms are rocked out of normal position in either direction, and thereafter return them to such position. The arms 4 and their heads 23 are slipped into place in the slots 22 from either side, and the pivots 6, which connect the pistons 5 with said arms, are inserted, before both face-plates 12 are bolted to the ring 7.

Any suitable kind of a recess may be made in the disk 3 for the reception of each spring 16. In the present case I slot the disk from side to side to produce a recess for each spring 16, and center such spring by means of two blocks 24 placed in said recess, with said spring between, and practically filling the spaces both sides of said spring between the latter and the face-plates 12. This is an inexpensive expedient and practicable for the purpose.

The plungers 5 and 9 may be provided with piston-rings 25, or other form of packing, to prevent in great measure or entirely the escape of air from the chambers 8 around said plungers. Thus air cushions are provided in the chambers 8, which assist the springs 10 in said chambers in receiving the thrusts from the pistons 5 and 9. Said air cushions not only supplement the springs 10 in serving as yielding buffers, but relieve said springs from some of the load they otherwise would have to carry.

The plungers 9 have rounded inner ends to ride on the periphery of the disk 3 between the slots 22. These plungers are free in a certain sense, while in the same sense the plungers 5 are not, since they are connected with the arms 4 and serve therewith to connect the ring 7 with the disk 3 and limit the amount of independent circumferential movement that may occur between said ring and disk in either direction. The plugs 11 are tapped into the outer ends of the chambers 8, and upon their removal access is had to the springs 10 and plungers 5 and 9. Thus a broken spring 10 can very readily be replaced. So, too, can a broken spring 16 be replaced, it only being necessary to remove one of the face-plates 12 and one of the blocks 24 that assists in centering such spring.

In the event of any serious breakage of any part of this hub, I have provided emergency means whereby the face-plates 12 with all connected parts can be rigidly secured to the disk 3 in such a manner that no independent movement between parts is possible. To this end one or more holes 26 are made in each face-plate 12, and one or more holes 27 are made in the disk 3, each pair of adjacent plate holes and the adjacent disk hole being so located that they aline with one another when the parts are disposed so that the arms 4 are in the centers of the slots 22; and a bolt 28 and a nut 29 (see Fig. 2) are provided for each set of three of said holes, that is, for each set of alining holes. In the event this emergency means is required, the hub or the axle upon which it is mounted is jacked up to allow the ring 7 to be centered on the axis of the disk 3, the parts are manipulated if necessary to bring each set of holes 26 and 27 into alinement, and a bolt 28 is passed through such set of holes and secured with its nut 29. Now the hub is practically a solid and unyielding unit, and there is no further liability of breakage or of damage from the injury already sustained by the hub. Upon the destination being reached, the emergency nuts and bolts are removed, the necessary repairs are made, and the hub is then ready for use again as a resilient wheel support.

A suitable spoke rim is mounted on the ring 7. This rim is for the inner ends of either the wooden or wire spokes upon which the wheel rim and tire are mounted. A rim 30 for wire spokes 31 is represented in the illustrations. The rim 30 is of channel-iron formation, and is secured to the ring 7 by means of bolts 32 and nuts 33, the former passing through the sides of said rim and through said ring. In order to render the rim 30 attachable and detachable it may be divided transversely into sections The adaptability of this hub or its parts for easy and quick assembling and disassembling is clearly apparent from what has hereinbefore been said upon this point, taken in connection with the drawings. This feature is especially important in the making of repairs and the replacing of worn and broken parts.

In practice the springs 10 and 16 yield and expand as the hub revolves under a load, and the arms 4 rock on their heads 23 in the slots 4 as the plungers 5 move in and out of their chambers 8, except whenever an arm chances to be perpendicular and in the center of its slot, then, of course, the axis of the plunger attached to such arm coincides with or is a continuation of the longitudinal center of said arm. The plungers 9 move in and out of their chambers 8, as the contacting parts of the disk periphery move toward and away from the inner ends of said chambers. There is a limited amount of relative movement circumferentially between the disk 3 and the contacting parts of the plungers 9, such movement being incidental to the independent movement permitted to the arms 4 by the slotted parts of said disk, and by said arms to the ring 7.

The hub is well balanced in its yielding parts, so that there is the requisite degree of moderation of movement, both from equilibrium and to recovery, it is stable, strong and durable, and well calculated to withstand lateral strain. When the hub is part of a rear or direct-driven wheel, the flexibility afforded by the floating annulus lessens the strain on the engine and transmission, as will be readily understood.

What I claim as my invention, and desire to secure by Letters Patent, is—

1. The combination, in a resilient wheel-hub, with a disk adapted to be mounted on an axle and having radial slots therein, of rocking arms mounted in the slotted parts of said disk, springs carried by said disk and projecting from opposite sides of its slots and bearing against opposite sides of said arms to center the latter normally in said slots, plungers pivotally connected with said arms, a floating ring around said disk and having chambers therein for said plungers, and removable plugs in the outer ends of said chambers.

2. The combination, in a resilient wheel-hub, with a disk adapted to be mounted on an axle and having radial slots therein, of rocking arms mounted in the slotted parts of said disk, springs carried by said disk and projecting from opposite sides of its slots and bearing against opposite sides of said arms to center the latter normally in said slots, plungers pivotally connected with said arms, a floating ring around said disk and having chambers therein for said plungers, the outer ends of said chambers being closed, and springs in said chambers between their closed ends and said plungers.

3. The combination, in a resilient wheel-hub, with a disk adapted to be mounted on an axle and having radial slots therein, of rocking arms provided with heads mounted in the slotted parts of said disk, springs carried by said disk to center normally said arms in said slots, plungers pivotally connected with said arms, and a floating ring around said disk and having chambers therein for said plungers, said chambers being closed at their outer ends.

4. The combination, in a resilient wheel-hub, with a disk adapted to be mounted on an axle and having radial slots therein, of rocking arms provided with heads mounted in the slotted parts of said disk, springs carried by said disk to center normally said arms in said slots, plungers pivotally connected with said arms, a floating ring around said disk and having chambers therein for said plungers, said outer ends of said chambers being closed, and springs in said chambers between the closed ends of the same and said plungers.

5. The combination, in a resilient wheel-hub, with a disk adapted to be mounted on an axle and having radial slots therein, of rocking arms mounted in the slotted parts of said disk, springs carried by said disk to center normally said arms in said slots, plungers pivotally connected with said arms, a floating ring around said disk and having chambers therein which are closed at their outer ends, said plungers operating in certain of said chambers, and other plungers operating in certain others of said chambers, said last-mentioned plungers bearing on the peripheral portions of said disk which are between said slots.

6. The combination, in a resilient wheel-hub, with a disk adapted to be mounted on an axle and having radial slots therein, of rocking arms provided with heads mounted in the slotted parts of said disk, springs carried by said disk to center normally said arms in said slots, plungers pivotally connected with said arms, a floating ring around said disk and having therein chambers with closed outer ends, said plungers operating in certain of said chambers, other plungers operating in certain others of said chambers and bearing on the disk periphery, and springs in said chambers between the closed ends thereof and said plungers.

7. The combination, in a resilient wheel-hub, with a disk provided with an axle sleeve, said disk having radial slots therein, and flanges mounted on said sleeve on both sides of said disk, of rocking arms mounted in the slotted parts of said disk, springs carried by said disk and projecting from opposite sides of its slots and bearing against opposite sides of said arms to center the latter normally in said slots, a floating ring around said disk, said ring having chambers therein, spring-pressed plungers in said chambers, said plungers being pivotally connected with said arms, and face-plates attached to said ring, but removable therefrom, and extending inwardly between said disk and said flanges, said face-plates being movable therebetween.

8. The combination, in a resilient wheel-hub, with a disk provided with an axle sleeve, said disk having radial slots therein, and removable flanges mounted on said sleeve both sides of said disk, of rocking arms mounted in the slotted parts of said disk, a floating ring around said disk, said ring having chambers therein, spring-pressed plungers in certain of said chambers, said plungers being pivotally connected with said arms, other spring-pressed plungers in certain others of said chambers, said last-mentioned plungers bearing on the disk periphery, spacer rings on said sleeve between said disks and said flanges and face-plates attached to said floating ring and extending inwardly between said disk and said flanges, said face-plates having a certain amount of movement therebetween without contact with said spacer rings.

9. The combination, in a resilient wheel-hub, with a disk provided with an axle sleeve, said disk having radial slots therein, and flanges mounted on said sleeve both sides of said disk, of spring-centered rocking arms mounted in the slotted parts of said disk, a floating ring around said disk, said ring having chambers therein, spring-pressed plungers in certain of said chambers, said plungers being pivotally connected with said arms, other spring-pressed plungers in certain others of said chambers, said last-mentioned plungers bearing on the disk periphery, and face-plates attached to said ring and extending inwardly between said disk and said flanges, said face-plates being movable therebetween.

JOSEPH W. BREADY.

Witnesses:
F. A. CUTTER,
C. P. KENNEY.